United States Patent

Swindlehurst

[15] 3,642,317
[45] Feb. 15, 1972

[54] VEHICLE BODY HEADLINING
[72] Inventor: Carl P. Swindlehurst, Madison Heights, Mich.
[73] Assignee: General Motors Corporation, Detroit, Mich.
[22] Filed: Aug. 28, 1970
[21] Appl. No.: 67,795

[52] U.S. Cl. .........................................296/137 A
[51] Int. Cl. ..............................................B60j 7/10
[58] Field of Search ......................296/137 R, 137 A

[56] References Cited

UNITED STATES PATENTS

| | | | |
|---|---|---|---|
| 2,042,431 | 5/1936 | Hooper | 296/137 A |
| 1,736,856 | 11/1929 | Lohrman | 296/137 A |
| 2,903,298 | 9/1959 | Stahl | 296/137 A |

FOREIGN PATENTS OR APPLICATIONS

| 865,977 | 10/1967 | Great Britain | 296/137 A |

*Primary Examiner*—Leo Friaglia
*Assistant Examiner*—Robert R. Song
*Attorney*—W. E. Finken and Herbert Furman

[57] ABSTRACT

A vehicle body includes a roof inner panel provided with a number of longitudinally spaced rows of laterally aligned T-shaped openings having their heads directed laterally of the body and their shanks directed longitudinally and forwardly of the body. An intermediate row of elongated openings divides the T-shaped openings into front and rear groups. The elongated openings extend laterally of the body and include elongated heads and narrower elongated shanks. The headlining is conventionally provided with listing wires received in pockets. Clips, corresponding in number and spacing to the openings in a respective row, are preassembled to each listing wire. Each clip includes a generally rectangularly shaped flat head, an intermediate integral neck, and an integral bifurcated body portion clamping the listing wire within a pocket. The listing wires respective to the rear group of openings are installed in sequence forwardly of the body by simultaneously inserting the heads of a row of clips within the heads of a row of T-shaped openings and then moving the listing wire forwardly of the body to move the necks of the clips within the shanks of such openings so that the clip heads overlie the inner panel and the clip necks engage the base edges of the shanks of the openings. At the intermediate row of openings, the heads of the clips are inserted within the elongated heads of the openings and the clips are then moved relative to the listing wire so that the clip heads overlie the shanks of such openings. This holds the necks of the preceding rows of clips against the base edges of the shanks of the T-shaped openings and tensions the headlining between the rows of installed clips. The remaining rows of clips are installed in the same manner as the rows preceding the intermediate row. The front and rear edges of the headlining are cemented to the backlite and windshield headers and the side edges are conventionally secured to the roof rails of the body.

4 Claims, 7 Drawing Figures

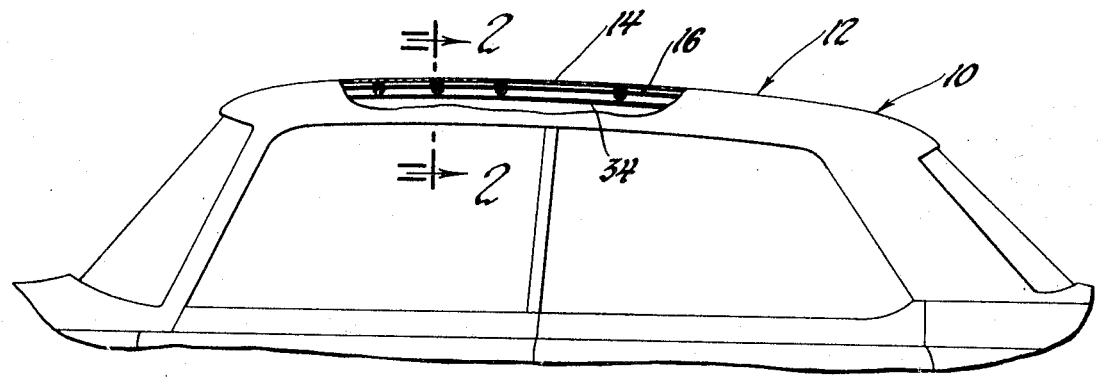
Fig. 1
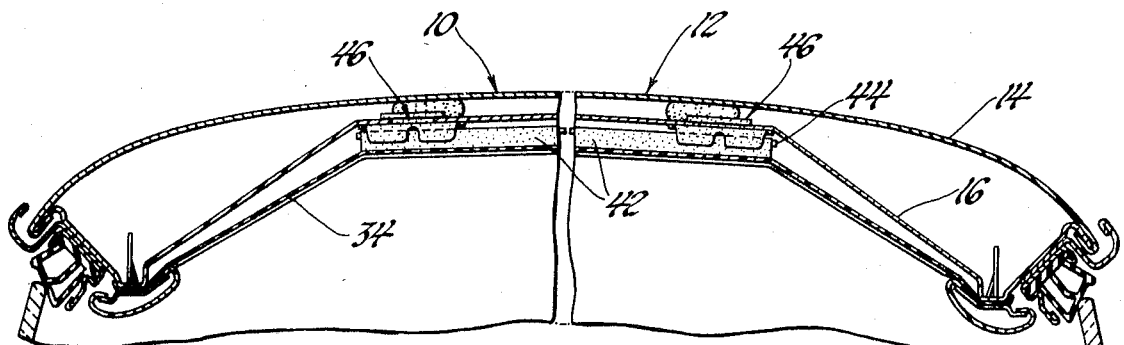
Fig. 2
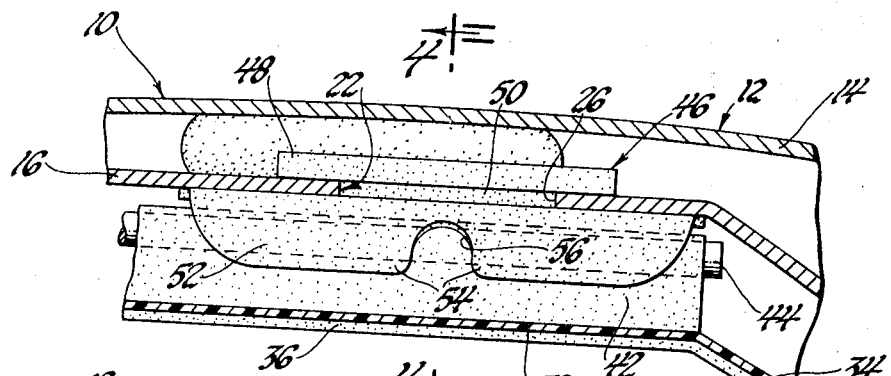
Fig. 3
Fig. 4
INVENTOR.
Carl P. Swindlehurst
BY
Herbert Furman
ATTORNEY INVENTOR.
Carl P. Swindlehurst
BY
Herbert Furman
ATTORNEY

VEHICLE BODY HEADLINING

This invention relates generally to vehicle body headlining and more particularly to vehicle body headlining wherein the headlining material, listing wires, and clips are preassembled as a unit and easily installed with a minimum of effort on the roof panel structure of a body.

Conventionally, vehicle bodies are provided with headlining to conceal and finish the inner surface of the roof panel structure and also the inner sail panels. The headlining is conventionally comprised of a number of sewn together sections of fabric or other flexible material having longitudinally spaced lateral pockets, each of which receives a listing wire. The listing wires are secured in various manners to the roof structure to thereby support the headlining on the body. It is important that the headlining be taut when installed to provide a finished appearance to the body.

One known headlining installation involves the provision of longitudinally spaced rows of laterally aligned openings in the roof structure. The openings are elongated and extend longitudinally of the body. Clips having elongated head portions and neck portions integrally joined to a clamping portion are installed in the openings by inserting the head portion of a clip in a respective opening and then rotating the clip laterally of the body so that the clip head portion overlies the roof structure to each side of the opening. Thereafter, each listing wire, after assembly to the headlining, is forced into engagement with the clamping portions of a row of clips. This installation has several disadvantages due to misalignment of the rows of clips and reverse rotation thereof.

The headlining of this invention overcomes these disadvantages and allows the headlining, the listing wires and the clips to be preassembled. Additionally, the installation operator need only move a minor number of clips when installing the headlining.

In the preferred embodiment of the invention, the inner panel of a vehicle body roof structure is provided with a number of rows of longitudinally spaced laterally aligned T-shaped openings. The openings are separated into front and rear groups by an intermediate row of elongated openings. The T-shaped openings each have the head portion thereof extending laterally of the body and the shank portion thereof extending longitudinally and forwardly of the body from the head portion. The intermediate row of openings includes elongated head portions extending laterally of the body and narrower but elongated shank portions likewise extending laterally of the body. The headlining, the clips, and the listing wires, all of which are generally the same as known like components, are preassembled. The clips clamp the listing wires through the headlining pockets and are spaced along each listing wire in accordance with the spacing of the head portions of a respective row of openings in the inner panel of the roof structure. To install the headlining, the head portions of the clips clamped to the rearmost listing wire are simultaneously inserted within the head portions of the rearmost row of T-shaped openings of the rear group and then the listing wire is moved forwardly of the body so that the neck portions of the clips move forwardly of the body within the shank portions of the openings and engage the base edges thereof and the head portions overlie the inner panel to each side of the shank portions of the openings. The succeeding listing wires of the rear group of openings are likewise installed. At the intermediate row of openings, the head portions of the clips are simultaneously inserted within the elongated head portions of the openings and then each clip is moved longitudinally of the listing wire and laterally of the body so that the head portion thereof overlies the inner panel to each side of the shank portion of a respective opening. This tensions the rearward part of the headlining between each row of openings of the rear group and between the intermediate row and such rows. The rows of openings of the front group each then receive in sequence respective rows of clips and the forward edge portion of the headlining is then conventionally cemented or otherwise secured to the windshield header. The rearward edge portion of the headlining is conventionally cemented to the backlite header and the side edges of the headlining are secured in conventional manner to the body side rails.

From the foregoing, it can be seen that the headlining of this invention permits the clips to be preassembled as a unit with respective listing wires and by properly spacing the clips the operator can simultaneously insert all of the clips of each listing wire within a respective row of openings. Thereafter, except for the intermediate row of clips, the operator need not position any of the clips with respect to the openings and need not tension the complete headlining once the intermediate row of clips is installed. Thus, ease of installation is attained.

The primary object of this invention is to provide an improved vehicle body headlining wherein the headlining material, listing wires and clips can be preassembled as a unit and the clips thereafter installed in a very simple and expeditious manner within openings in a vehicle body roof panel without requiring more than a minimum number of clips to be moved with respect to a respective listing wire.

This and other objects of the invention will be readily apparent from the following specification and drawings wherein:

FIG. 1 is a partially broken away partial side elevational view of a vehicle body embodying a headlining according to this invention;

FIG. 2 is an enlarged sectional view taken generally along the plane indicated by line 2—2 of FIG. 1;

FIG. 3 is an enlarged view of a portion of FIG. 2;

FIG. 4 is a sectional view taken generally along the plane indicated by line 4—4 of FIG. 3;

Figure 5:
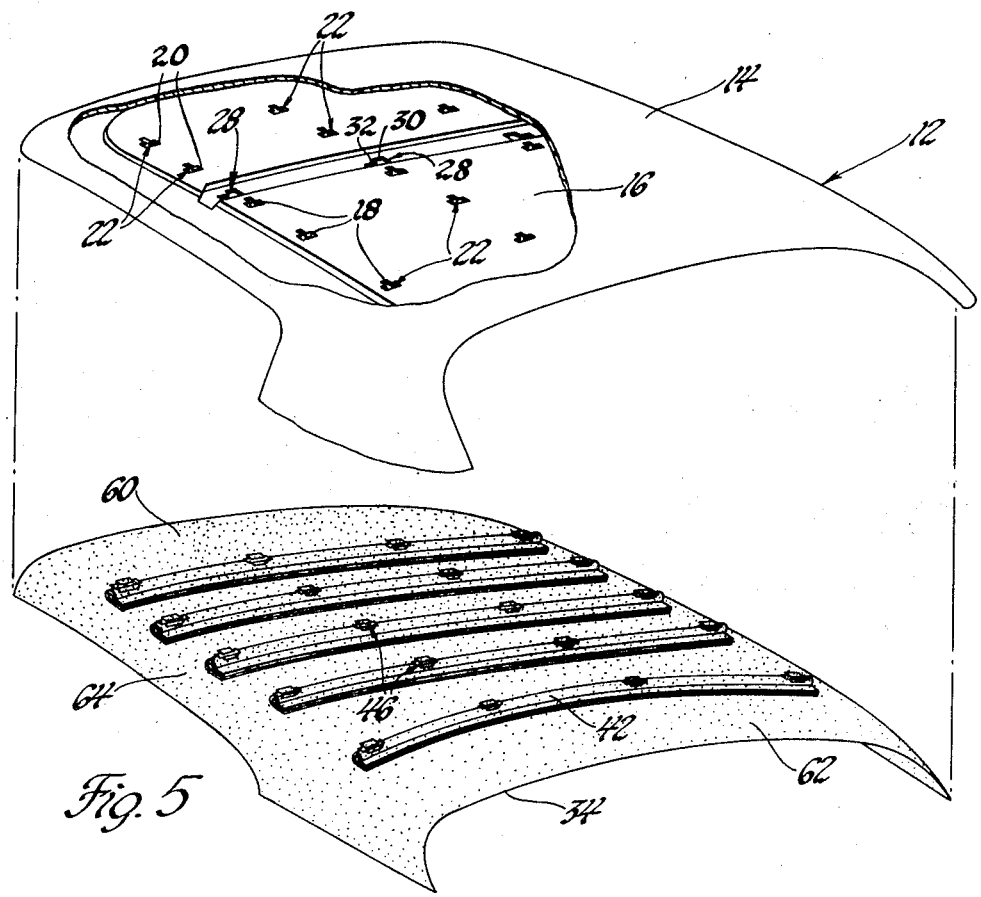
FIG. 5 is an exploded perspective view of the headlining and the body roof structure, with the outer panel being broken away.

Referring now to the drawings, a vehicle body designated generally 10, as shown in FIG. 1, includes a roof structure 12 which includes a roof outer panel 14 and a roof inner panel 16. As is set forth in detail in copending application, Ser. No. 63094 (A–13,022), Foster et al., filed Aug. 12, 1970, the inner panel 16 and the outer panel 14 are adhesively and otherwise secured to each other. Since the details of the roof structure 12 form no part of this invention, they are not set forth herein, and reference may be had to the aforenoted application for such details.

As shown in FIG. 5, the inner panel 16 is provided with a number of longitudinally spaced rows 18 and 20 of laterally aligned generally T-shaped openings 22. As shown in detail in FIGS. 6 and 7, each opening 22 includes an elongated head portion 24 which extends laterally of the body and a shank portion 26 which extends longitudinally and forwardly of the body with respect to the head portion 24. The rows 18 and 20 are separated into rear and front groups, respectively, by an intermediate row of openings 28. As best shown in FIG. 5, the openings 28 include an elongated head portion 30 which extends generally laterally of the body and an elongated shank portion 32 which likewise extends generally laterally of the body but is narrower than the head portion 30. The openings 28 are asymmetrically arranged laterally of the body.

The headlining 34 as shown in FIGS. 4 and 5 through 7, inclusive, is conventionally comprised of a number of sewn together sections of fabric or other flexible material. The sewn joints between the sections include a reverse bent edge portion 36 of one section sewn to an edge portion 38 of the succeeding section, forwardly of the body, and also sewn to the edge portions 40 of a loop of flexible material which provides what is conventionally known as a pocket 42. A pocket 42 is conventionally provided at each of the sewn joints between the sections. A conventional listing wire 44 is received within each of the pockets 42.

Figure 6:
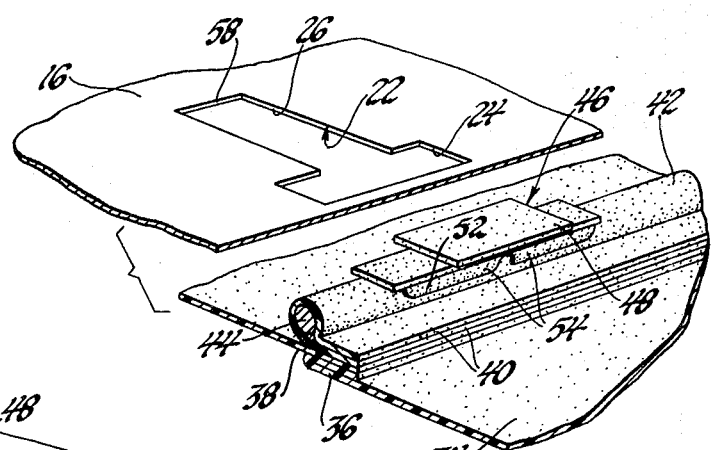
FIG. 6 is a perspective view of a clip and a respective opening prior to interim engagement.
Figure 7:
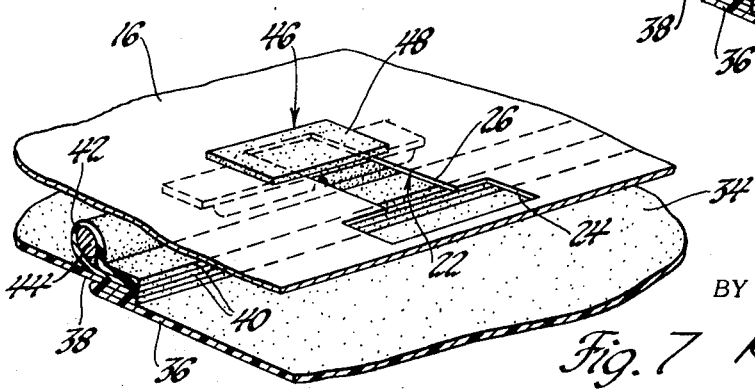
FIG. 7 is a view similar to FIG. 6 showing the installed position of a clip and a respective opening.

The clips 46 for mounting the listing wires on the body are best shown in FIGS. 3, 4 and 6. Each clip comprises an elongated, generally flat head portion 48 of rectangular shape. The general size of the head portion 48 is slightly smaller than the head portions 24 of openings 22 and the head portions 30 of the openings 28. An elongated neck portion 50 of rectangular shape integrally connects the head portion 48 with an integral clamping portion 52. The length of the neck portion 50, measured longitudinally of the head portion 48, is slightly smaller than the width of the shank portions 26 of openings 22, and the width of the neck portion 50, measured laterally of the head portion 48, is slightly smaller than the width of the shank portions 32 of openings 28. The clamping portion 52 comprises a spaced pair of like arcuately shaped legs 54, each of which includes an intermediate notch 56 for flexibility. The clip 46 is preferably formed of a flexible plastic material inasmuch as the legs 54 must flexibly move relative to each other.

When the headlining 34, pockets 42 and listing wires 44 have been assembled, a number of clips 46 are assembled to each listing wire by forcing the pocket material and listing wire between the legs 54 of the clips so that the legs grip the listing wire through the pocket as shown in FIGS. 4 and 5. The spacing of the clips 46 along a listing wire respective to a row 18 or 20 corresponds to the spacing of the head portions 24 of the openings 22 of such rows, and the spacing of the clips on the listing wire respective to the openings 28 corresponds to the spacing of the head portions 30 of such openings.

It can thus be seen from the foregoing that the headlining material, the listing wires, and the clips are preassembled as a unit. This is an important advantage of the headlining of this invention over known headlinings which do not permit such assembly prior to installation and therefore require the operator to handle a multitude of parts and oftentimes to install the clips independently of installation of the headlining.

To install the headlining 34, the clips 46 secured to the listing wire 44 and pocket 42 respective to the rearmost row of openings 18 are simultaneously inserted within the head portions 24 of such row of openings. The listing wire is then moved forwardly of the body or to the left as viewed in FIGS. 5 and 6. This moves the neck portions 50 of such clips within the shank portions 26 of the openings and into engagement with the base edges 58 of such shank portions. The head portions 48 of the clips thus overlie the inner panel 16 to each side of the shank portions 26 to support the listing wire on the inner panel. The inner panel is clamped between the head portions 48 of the clips and the upper edges of the legs 54 as shown in FIG. 4. The operator then installs the listing wires respective to the remaining rows 18 of openings 22 in sequence in the same manner. Thus, the rear portion of the headlining is quickly and easily installed, and it will be noted that the operator is not required to move or position any of the clips 46 with respect to any of the openings 22 of the rows 18.

To install the clips 46 in the openings 28, the head portions 48 of the clips are inserted within the head portions 30 of such openings. Thereafter the operator moves each of the clips 46 laterally of the body or longitudinally of the listing wire so that the neck portions 50 of such clips move within the shank portions 32 of the openings 28 and into engagement with the base edges thereof. This tensions the headlining between the openings 28 and the preceding row of openings 22 and likewise tensions the headlining in sequence between the preceding rows of openings. Thus, once the clips 46 respective to the openings 28 are installed, the operator need no longer manually tension the headlining to maintain the neck portions 50 of the clips 46 in engagement with the base edges 58 of the shank portions 26 of openings 22.

The listing wires respective to the openings 22 of rows 20 are thereafter installed in sequence in the same manner as the listing wires respective to the openings 22 of rows 18. The operator then cements the forward edge portion 60 of the headlining to the windshield header of the body to maintain the neck portions 50 of the clips in engagement with the base edges of the openings 22 of rows 20. This is conventional. Likewise the operator conventionally cements the rearward edge portion 62 of the headlining to the backlite header and conventionally secures the edge portions 64 to the roof rails of the body. The details of such conventional securing means are not shown since they are well known.

Thus, this invention provides an improved vehicle body headlining.

I claim:

1. In combination with a vehicle body having a roof inner panel and a vehicle body headlining including a number of longitudinally spaced listing wires, the improvement comprising, a number of longitudinally spaced rows of laterally spaced openings in the inner panel, each opening including a head portion and a shank portion extending therefrom, a plurality of clips, each including a head portion generally corresponding in shape and size to the head portions of the openings and of greater size than the shank portions of the openings, a neck portion extending therefrom, and a securing portion for attaching the clip to a listing wire, the clips attached to a respective listing wire corresponding in number and spacing to the number and spacing of respective openings of a row, the head portions of the clips being inserted within the head portions of a row of respective openings and the clips being movable with respect to the openings to position the head portions of the clips in overlying relationship to the inner panel to each side of the shank portions of the row of openings and to position the neck portions of the clips within the shank portions of the openings in engagement with an edge thereof to position the clips with respect to the inner panel.

2. In combination with a vehicle body having a roof inner panel and a vehicle body headlining including a number of longitudinally spaced listing wires, the improvement comprising, a number of longitudinally spaced rows of laterally spaced generally T-shaped openings in the inner panel, each opening including a head portion extending laterally of the body and a shank portion extending therefrom longitudinally of the body, a plurality of clips, each including a head portion generally corresponding in shape and size to the head portions of the openings and of greater size than the shank portion of the openings, a neck portion extending therefrom, and a securing portion for attaching the clip to a listing wire, the clips attached to a respective listing wire corresponding in number and spacing to the number and spacing of respective openings of a row, the head portions of the clips being simultaneously inserted within the head portions of a row of respective openings and being positioned in overlying relationship to the inner panel to each side of the shank portions of the row of openings upon movement of the listing wire longitudinally of the body, the neck portions of the clips being received within the shank portions of the openings in engagement with an edge thereof to position the clips longitudinally of the body.

3. In combination with a vehicle body having a roof inner panel and a vehicle body headlining including a number of longitudinally spaced listing wires, the improvement comprising, a number of longitudinally spaced rows of laterally spaced generally T-shaped openings in the inner panel, each opening including a head portion extending laterally of the body and a shank portion extending therefrom longitudinally of the body, a row of laterally spaced elongated openings in the inner panel intermediate preceding and succeeding groups of rows of T-shaped openings; each elongated opening including a head portion extending laterally of the body and a shank portion extending therefrom laterally of the body, a plurality of clips, each including a head portion generally corresponding in shape and size to the head portions of the openings and of greater size than the shank portions of the openings, a neck portion extending therefrom, and a securing portion for attaching the clip to a listing wire, the clips attached to respective listing wire corresponding in number and spacing to the number and spacing of respective openings of a row, the listing wires respective to the rows of the preceding and succeeding group being mounted on the body in sequence by simultaneously inserting the head portions of the clips within the head portions of a row of respective openings and moving the listing wire longitudinally of the body to position the head portions in overlying relationship to the inner panel to each side of the shank portions of the row of openings and to position the neck portions of the clips within the shank portions of the openings in engagement with an edge thereof to position the clips longitudinally of the body, the listing wire respective to the intermediate row of openings being mounted on the body by inserting the head portions of the clips within the head portions of the openings and moving the clips relative to the listing wire to position the head portions of the clips in overlying relationship to the inner panel to each side of the shank portions of the row of openings and to position the neck portions of the clips within the shank portions in engagement with an edge thereof to hold the neck portions of the clips of the preceding row in engagement with the edges of the shank portions of their respective openings.

4. In combination with a vehicle body having a roof inner panel and a vehicle body headlining, the improvement comprising, a number of longitudinally spaced rows of laterally spaced generally T-shaped openings in the inner panel, each opening including a head portion extending laterally of the body and a shank portion extending therefrom longitudinally of the body, a number of longitudinally spaced rows of laterally spaced clip means mounted on the headlining, each clip means being of generally T shape and including a head portion of greater size than the shank portion of the openings and a neck portion extending from the head portion, the clip means corresponding in number and spacing to the number and spacing of respective openings of a row, the head portions of the clip means being simultaneously inserted within the head portions of a row of respective openings, the clip means being simultaneously movable longitudinally of the body to move the neck portions of the clip means into the shank portions of the openings and move the head portions of the clip means into overlying relationship to the inner panel to each side of the shank portions of the openings.

\* \* \* \* \*